United States Patent [19]
Nakano et al.

[11] Patent Number: 5,654,368
[45] Date of Patent: Aug. 5, 1997

[54] RECYCLABLE CROSS-LINKED POLYMER, METHOD FOR PRODUCING A MOLDED ARTICLE, AND METHOD FOR RECYCLING THE SAME

[75] Inventors: Mitsuru Nakano, Amherst, Mass.; Makoto Mouri, Aichi, Japan; Arimitsu Usuki, Aichi, Japan; Akane Okada, Aichi, Japan

[73] Assignee: Kabushiki Kaisha Toyota Chuo Kenkyusho, Aichi-ken, Japan

[21] Appl. No.: 609,347

[22] Filed: Mar. 1, 1996

[30] Foreign Application Priority Data

Mar. 3, 1995 [JP] Japan ................................. 7-070893

[51] Int. Cl.$^6$ ............................. C08J 11/10; C08G 77/00; C08G 75/00
[52] U.S. Cl. ..................... 525/193; 525/105; 525/106; 525/146; 525/150; 525/192; 525/194
[58] Field of Search ................................. 515/193, 105, 515/106, 146, 150, 192, 194

[56] References Cited

U.S. PATENT DOCUMENTS 4,882,399 11/1989 Tesoro et al. ............................. 528/353
5,260,411 11/1993 Tesoro et al. ............................. 525/523

Primary Examiner—Irina S. Zemel
Attorney, Agent, or Firm—Oblon, Spivak, McClelland, Maier & Neustadt, P.C.

[57] ABSTRACT

The invention is to provide elastomer-like or rubber-like, recyclable cross-linked polymers capable of being liquefied and re-molded repeatedly without detracting from the physical properties of the polymers. The polymer comprises meltable cross-linked oligomer units and linkage units via which the oligomer units are linked to construct the main chains of the polymer. Each linkage unit in the polymer comprises a chemical bond that can be cleaved and re-formed repeatedly by predetermined treatment by which the bond between monomers in the oligomer units are not cleaved. The method for producing the polymer comprises a step of forming oligomer units by polymerizing monomers, a step of forming linkage units by linking the oligomer units via linkage units and a step of forming cross-linked units between the oligomer units.

5 Claims, 8 Drawing Sheets

X—Y + nM ⟶ X—M$_n$—Y

HOOCH$_2$CH$_2$C(CH$_3$)(CH$_3$)—N=N—C(CH$_3$)(CH$_3$)CH$_2$CH$_2$COOH

HOOCH$_2$CS—SCH$_2$COOH

F I G. 8
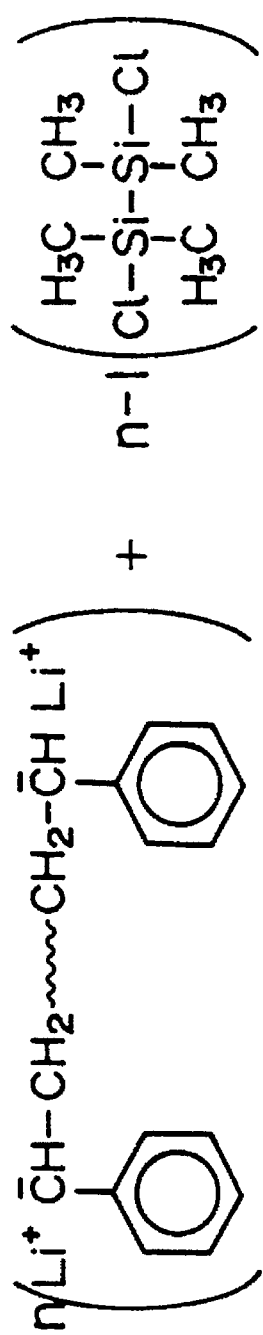
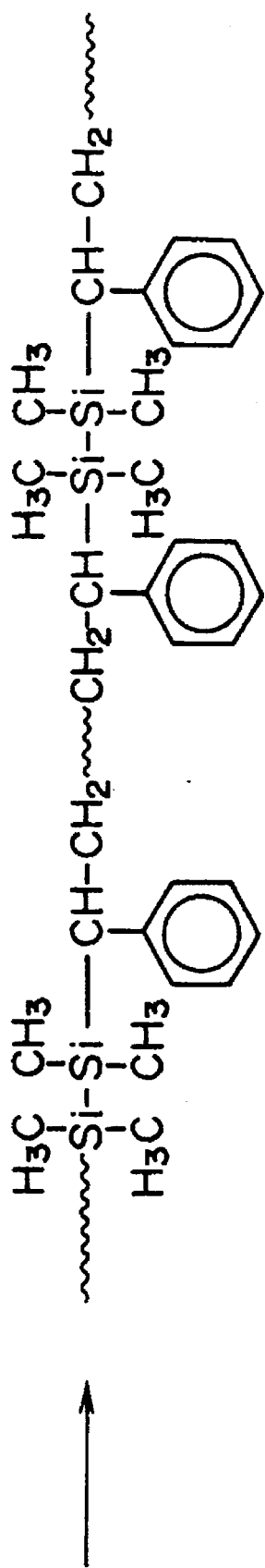

RECYCLABLE CROSS-LINKED POLYMER, METHOD FOR PRODUCING A MOLDED ARTICLE, AND METHOD FOR RECYCLING THE SAME

BACKGROUND OF THE INVENTION

1. Field of the Invention

The present invention relates to elastomer-like or rubber-like, recyclable cross-linked polymers, methods for producing a molded article, and methods for recycling the polymers. Specifically, the present invention is to provide novel, elastomer-like or rubber-like, recyclable cross-linked polymers capable of being molded into articles of any desired shapes, which is characterized in that the wastes and the defectives of the molded articles as well as the molding wastes can be liquefied, while making the resulting liquids still maintain their intrinsic elastomer-like or rubber-like physical properties on a practicable level, and again re-molded into articles of any desired shapes.

2. Description of the Related Art

A technique is disclosed in U.S. Pat. No. 5,260,411 (prior art 1) and U.S. Pat. No. 4,882,399 (prior art 2) of introducing S—S bonds into the main chain of an epoxy resin or polyimide polymerized by addition (thermosetting), reducing the bonds (—S—S——→—SH HS—) to decompose (or liquefy) the resin into low-molecular moieties and, on the contrary, oxidizing the ends (—SH HS——→—S—S—) to re-cure the resin.

Ordinary, so-called vulcanized rubber (prior art 2) is produced by mixing raw rubber which is an aggregate of organic compounds with long carbon main chains, with sulfur or sulfur compounds. Because this process produces various sulfur cross-links such as —S— bonds, —S—S— bonds, —S—S—S— bonds, etc. between the carbon main chains, the vulcanized rubber exhibits elastomer-like or rubber-like properties.

When the polymers of the above-mentioned prior art 1 and prior art 2 are desired to be recycled by liquefying the molded articles and following re-molding of the resulting liquids, there occur various problems such as those mentioned below.

Problems with prior art 1:

The proportion of S—S bonds to be introduced into a polymer, ρ (number of S—S bonds in polymer:number of monomer units in polymer) is from 1:1 to 1:2 or so, and the density of the S—S bonds introduced into the main chain of the polymer is extremely high.

This is because epoxy resins and thermosetting polyimides need a high cross-link density in itself. Accordingly, S—S bonds must be introduced into them at high density so that melting of the cross-linked epoxy resins or polyimides should be relied only on the cleavage of the S—S bond itself that is introduced into their main chains. For these reasons, the high proportion of S—S bonds polymers is inevitable in the prior art 1.

This makes it difficult to liquefy the polymers within a short period of time by cleaving the S—S bonds thereof. This is because the penetration of an agent for cleaving S—S bond into the polymers is difficult because of high density of cross-links but rather a large amount of the agent must be introduced into the cross-linked polymers in order that the high-density S—S bonds in the polymers can be cleaved within a short period of time. For these reasons, the technique of the prior art 1 is not practicable in view of the processing speed.

Problems with prior art 2:

Since various sulfur cross-links, such as —S— bonds, —S—S— bonds, —S—S—S— bonds, etc. are formed between the carbon main chains in the vulcanized rubber, it is difficult to effectively cut all these cross-links at the same time to liquefy the rubber. In particular, —S— bonds are difficult to be cut and the vulcanized rubber with such —S— bonds is not easy to be liquefied. If such —S— bonds are forced to be cut under severe conditions, even the bond between carbons of the main chains are also cut. This raises another problem that the physical properties of units to be rebonded to a recycled rubber are changed.

SUMMARY OF THE INVENTION

We, the present inventors have noted that there is a great need of re-molding elastomer-type or rubber-type cross-linked polymers but any material that meets the need has not been provided as yet.

Therefore, the object of the present invention is to provide elastomer-like or rubber-like, recyclable cross-linked polymers capable of being liquefied or melted and re-molded at a practicable level without detracting from their intrinsic properties, methods for producing molded articles, and methods for recycling the polymers.

First Aspect of the Invention:

The first aspect of the present invention is to provide an elastomer-like or rubber-like, recyclable cross-linked polymer, which comprises:

oligomer units having polymerization degree or molecular weight that allows the units to liquefy;

cross-linked units for making cross-linked oligomer units which are allowed to liquefy by cross-linking said oligomer units individually; and linkage units linking a plurality of said oligomer units to form a main chain of the polymer, said linkage units comprising at least one chemical bond that can be cleaved and re-formed repeatedly by predetermined treatment that does not break a bond between monomers constituting the oligomer units.

According to the first aspect of the present invention, the recyclable cross-linked polymer can be liquefied by cleaving the chemical bonds in the linkage units therein. The liquefaction of the polymer is not accompanied by any difficulty, which is inevitable in the above-mentioned prior art techniques, and does not damage at all the oligomer units in the polymer. In addition, since the recyclable cross-linked polymer of the present invention is an elastomer-like or rubber-like one and is therefore not required to have high heat resistance and high rigidity, the density of the cross-linked units in the polymer is originally low. Accordingly, the penetration of an agent for cleaving a linkage unit into the polymer is not retarded by the cross-linked units.

For these reasons, the elastomer-like or rubber-like properties of the recyclable cross-linked polymer of the first aspect of the present invention are not worsened at all even by the introduction of the linkage units thereinto. In addition, it is possible to liquefy and re-mold the polymer at a practicable processing speed without detracting from its physical properties.

Second Aspect of the Invention:

The second aspect of the present invention is a method for producing a molded article of the recyclable cross-linked polymer of the first aspect as mentioned above, comprising the steps of:

(1) forming said oligomer units by polymerizing monomers;

(2) linking ends of the oligomer units or monomers to constitute ends of the oligomer units to said linking units; and (3) forming cross-linked units by cross-linking the oligomer units and/or the main chains, any one of the steps being conducted under the condition of shape confinement with a shape forming means provided that said one includes a solidification process.

As a result of the method of the second aspect as above, comprising the steps of forming oligomer units, linkage units and cross-linked units, the recyclable cross-linked polymer of the first aspect is constructed. Of these steps, the step to be accompanied by cross-linkage of the material is conducted under such condition that the shape of the material to be molded is determined by any shaping means, and therefore the polymer is molded into an article of any desired shape.

Accordingly, the method of the second aspect is an effective means of providing the recyclable cross-linked polymer of the first aspect.

Third Aspect of the Invention:

The third aspect of the present invention is a method for producing a molded article of the recyclable cross-linked polymer of the first aspect as mentioned above, comprising the steps of:

(1) forming said oligomer units by polymerizing monomers;

(2) linking ends of the oligomer units or monomers to constitute the ends of the oligomer units to precursors of the linkage units;

(3) completing the linkage units from the precursors; and (4) forming the cross-linked units by cross-linking between the oligomer units and/or the main chains, any one of the steps being conducted under the condition of shape confinement with a shape forming means provided that said one includes a solidification process.

As a result of the method of the third aspect as above comprising the step of forming oligomer units, the step of preparing linkage units, the step of completing the linkage units and the step of forming cross-linked units, the precursors of the linkage units are linked to the individual oligomer units or the monomers constituting the individual oligomer units, and thereafter the desired linkage units are completed, and eventually the recyclable cross-linked polymer of the first aspect is constructed. Of these steps, the step to be accompanied by cross-linkage of the material is conducted under such condition that the shape of the material to be molded is determined by any shaping means, and therefore the polymer is molded into an article of any desired shape.

The third aspect provides a method of effectively producing a recyclable cross-linked polymer, in which the chemical bonds in the linkage units are —S—S— bonds and the cross-linked units are attained by vulcanization. Specifically, according to the method of the third aspect to produce the intended polymer, if the step of forming the oligomer units is followed by the step of preparing linkage units by linking the ends of the individual oligomer units with precursors of the linkage units, —SH groups, then followed by the step of cross-linking the oligomer units by vulcanization and thereafter finally followed by the step of completing the linkage units of —S—S— bonds by oxidation, the sites to be formed into the linkage units are blocked with —SH groups during the vulcanization, by which any random formation of various cross-linked bonds vulcanized bonds such as —S—, —S—S—, and —S—S—S— is prevented, with the result that only the formation of —S—S— bonds in the resulting linkage units is ensured.

Accordingly, the third aspect provides a method of effectively producing the recyclable cross-linked polymer of the first aspect, wherein the linkage units in the polymer are completed after their precursors have been linked with the oligomer units or with the monomers constituting the oligomer units.

Fourth Aspect of the Invention:

The fourth aspect of the present invention is a method for recycling a material or a shaped article comprising the recyclable cross-linked polymer of the first aspect as mentioned above or a mixture of such a material or shaped article and other material(s), comprising the steps of:

(a) decomposing the recyclable cross-linked polymer into aggregates of liquefied cross-linked oligomer units by subjecting the polymer to the predetermined treatment to cleave the chemical bonds in the linkage units of the polymer;

(b) collecting the aggregates of the liquefied cross-linked oligomer units; and (c) regenerating the linkage units by subjecting the collected aggregates to the predetermined treatment to re-form the chemical bonds in the linkage units, any one of the steps being conducted under the condition of shape confinement with a shape forming means provided that said one includes a solidification process.

As a result of the method of the fourth aspect as above comprising the decomposition step, the material or shaped article comprising the recyclable cross-linked polymer is decomposed into aggregates of liquefied cross-linked oligomer units, and even if the polymer is mixed with other material(s), the aggregates can easily be collected. After the decomposition step has been followed by the step of re-forming linkage units and optionally by the step of re-forming cross-linked units, a molded article of the recyclable cross-linked polymer is again re-constructed. Of these steps, the step to be accompanied by cross-linkage of the material is conducted under such condition that the shape of the material to be molded is determined by any shaping means, and therefore the polymer is molded into an article of any desired shape.

The method of the fourth aspect of regenerating the molded article does not cause any change in the physical properties of the regenerated article, being different from the above-mentioned prior art 2.

Therefore, the recycling method of the fourth aspect provides an effective means of regenerating a molded article of a recyclable cross-linked polymer by effectively collecting the aggregates of oligomer units from the waste materials or molded articles of the recyclable cross-linked polymer of the first aspect as mentioned above.

BRIEF DESCRIPTION OF THE DRAWINGS

FIG. 8 shows one example of decomposable polymers.

DETAILED DESCRIPTION OF THE INVENTION

Figure 1:
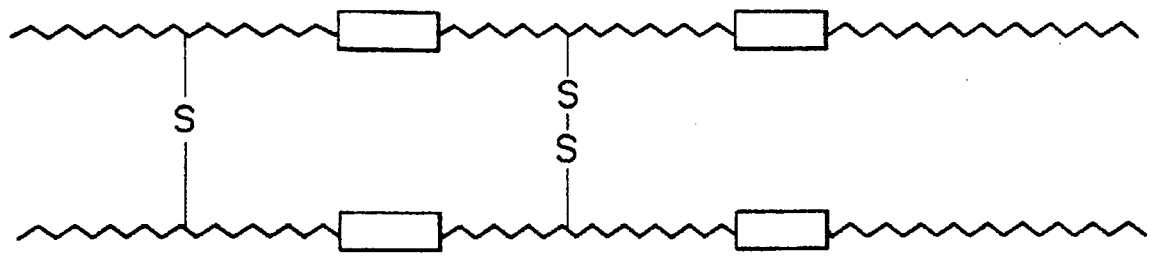
FIG. 1 is a graphical view showing the structure of the recyclable cross-linked polymer in Embodiment 1.

The first aspect to the fourth aspect of the present invention are described in detail hereinunder.

Recyclable Cross-linked Polymers:

The recyclable cross-linked polymers of the present invention have elastomer-like or rubber-like properties. With respect to their properties, the polymers are not specifically defined and include, for example, those which are classified into elastomers or rubbers on the basis of their chemical structures and those which exhibit so-called elastomer-analogous or rubber-analogous properties.

The following examples 1 to 3 are preferred as exhibiting good rubber-like elasticity under practical conditions. In general, polymers having a cross-link density of more than 10% could not exhibit rubber-like elasticity.

1 Polymers having a glass transition point of not higher than 0° C.

2 Polymers having a cross-link density (to be represented by % by weight of the cross-linked units in the polymer with respect to the whole weight of the polymer) of from 0.1 to 10%.

3 Especially polymers having a cross-link density of from 0.1 to 5%.

With respect to their molecular structures, polymers which are amorphous (or non-crystalline) in the presence of no stress at temperatures not lower than their glass transition point are also preferred.

With respect to their characteristics, also preferred are polymers which can be rapidly stretched and prolonged (for example, by from several tens % to several hundreds %) under tension without losing their energy and which can be rapidly shrunk and restored to their original length immediately after the tension as applied thereto has been removed.

With respect to the type of the structures of recyclable cross-linked polymers, employable is any of homopolymers, random copolymers, alternate copolymers, block copolymers and graft copolymers into which linkage units and cross-linked units have been introduced.

Examples are cross-linked butadiene rubber, isoprene rubber, butyl rubber, ethylene-propylene rubber, styrene-butadiene rubber, chloroprene rubber, nitrile rubber, acryl rubber, epichlorohydrin rubber, chlorosulfonated polyethylene, chlorinated polyethylene, silicone rubber, fluorine rubber, etc., into which linkage units have been introduced.

Oligomer Units:

The degree of monomer polymerization and the molecular weight of each oligomer unit to be in the polymer of the present invention are not specifically defined, provided that the individual oligomer units can be melted into melts. The terminology "melt" as referred to herein indicates that the oligomer unit can be plasticized so that additives can be added thereto or the plasticized oligomer can be shaped or molded. To bring the present material to the state of "melt" is referred to "melt" or "liquefy". It is especially preferable that the oligomer units can be actually melted under practical conditions including temperature. Regarding actual degrees of polymerization and molecular weights, since these are determined depending on the type of the recyclable cross-linked polymers that meet the objects of the invention, it is difficult to unconditionally define these herein. As examples, dimer or oligomer units having a molecular weight of less than 500 can be effectively used, or, as the case may be, several tens-mer or oligomer units having a molecular weight of about 10,000 or more may also be used effectively.

In the oligomer units, the monomers need not always be linear but may be branched.

Cross-linked Oligomer Units:

The degree of monomer polymerization, the degree of cross-linking and the molecular weight of the cross-linked oligomer units may be such that the units can be melted into melts. The terminology "melt" as referred to herein indicates that the cross-linked oligomer unit can be plasticized so that additives can be added thereto or the plasticized, cross-linked oligomer unit can be shaped or molded. It is especially preferable that the cross-linked oligomer units can be actually melted under practical conditions including temperature. Regarding actual degrees of polymerization, degrees of cross-linking and the molecular weight, since these are determined depending on the type of the recyclable cross-linked polymers that meet the objects of the invention, it is difficult to unconditionally define these herein.

Additives:

The recyclable cross-linked polymer of the present invention may contain other polymers that can be blended with ordinary elastomers or rubber, as well as various additives that can be added thereto. Some examples of such additives are a vulcanizer, a vulcanization promoter, a reinforcing agent such as carbon black or the like, a filler to increase the volume of the polymers, an antioxidant, a softener, etc.

Cross-linked Units:

Most cross-linked units in the recyclable cross-linked polymer of the present invention are composed of cross-links attainable by so-called "vulcanization", such as sulfur-vulcanized cross-links comprising —S—, —S—S—, —S—S—S—. However, such are not limitative. The units may also be composed of non-sulfur cross-links, for example, peroxide cross-links to be formed between the carbon main chains of the polymers by radical formation therebetween.

Linkage Units:

The linkage units in the recyclable cross-linked polymer of the present invention must comprise chemical bond(s) via which the oligomer units in the polymer are linked and must be such that the linked oligomer units can be repeatedly cleaved and re-linked via the chemical bond(s) by predetermined treatment by which the monomer-to-monomer bond in each oligomer unit is not cleaved. However, the treatment for cleaving the chemical bond(s) via which the oligomer units are linked shall not exclude the case where the cross-links in the cross-linked units are partly cut by the treatment. For example, the case includes the constitution where the chemical bonds in the linkage units are disulfide bonds (—S—S—) and the cross-linked units comprise sulfur cross-links (—S—, —S—S—, —S—S—S—, etc.).

As one example of the linkage units, —Si—Si— bond is mentioned. The linkage units of this type can be introduced, for example, by employing compounds having a monochlorosilyl group (—Si—Cl ) as those for constructing the linkage units. The —Si—Si— bond can be cleaved by irradiation of ultraviolet light (at 254 nm) thereto and can be re-formed by coupling reaction.

As another example of the linkage units, an ester bond (—C(=O)—O—) is mentioned. The linkage units of this type can be introduced, for example, by employing compounds having a carboxyl group and compounds having a hydroxyl group as those for constructing the linkage units. The ester bond can be cleaved by hydrolysis and can be re-formed by condensation. It is not recommended not to use the linkage units comprising such ester bond(s) in polyurethanes, polyamides, polycarbonates, polyesters and the like where the monomer-to-monomer bonds are easily hydrolyzed.

As still another example of the linkage units, the above-mentioned disulfide bond (—S—S—) is mentioned. The linkage units of this type can be introduced, for example, by employing compounds having a mercapto group as those for constructing the linkage units. The disulfide bond can be cleaved by reduction and can be re-formed by oxidation.

Figure 2:
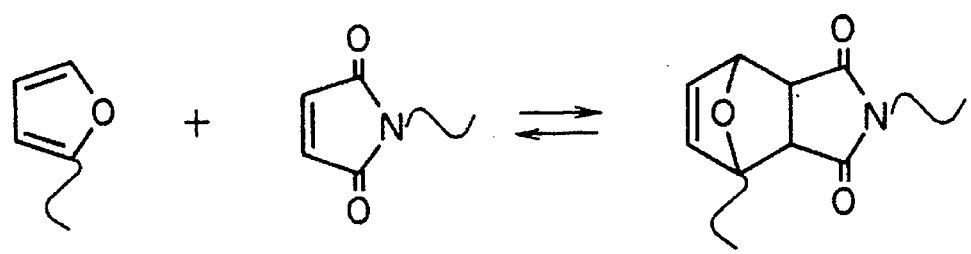
FIG. 2 shows one example of linkage units in the polymer of the present invention.

As still another example of the linkage units, a linkage to be derived from a furan ring and a maleimide ring as precursors is mentioned. The linkage units of this type can be introduced, for example, by bonding one monomer or oligomer to a furyl group and bonding the other monomer or oligomer to a maleimide group. These can be cleaved and re-formed according to the Diels-Alder reaction as shown in FIG. 2. The S-shaped bonds shown in FIG. 2 are those via which the linkage unit is linked to oligomers. As the case may be, the linkage unit may be linked to oligomers via an alkylene group.

Figure 3:
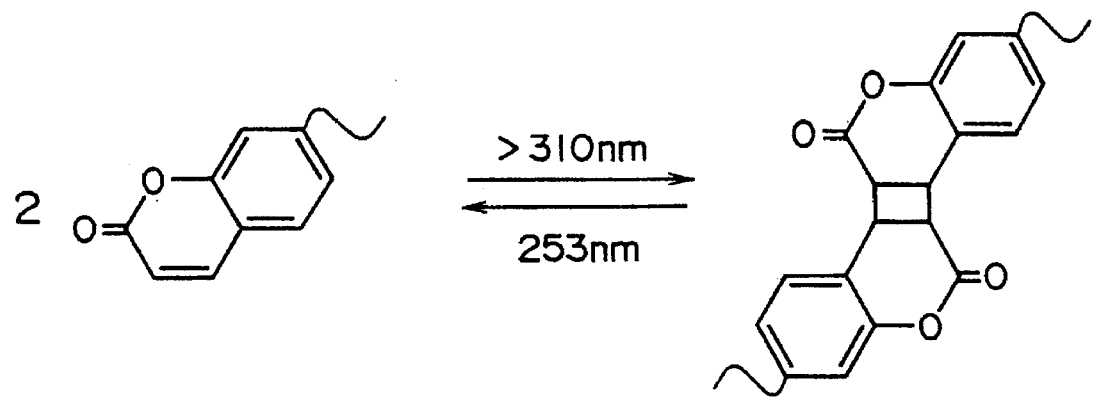
FIG. 3 shows another example of linkage units in the polymer of the present invention.

As still another example of the linkage units, a linkage to be derived from coumarins, anthracenes and the like as precursors is mentioned. The linkage units of this type are completed by bonding the counter monomer or oligomer to coumarin or anthracene as a precursor of the intended linkage, followed by photo-dimerizing it while irradiating thereto ultraviolet light having a wavelength as shown in FIG. 3. The S-shaped bonds shown in FIG. 3 have the same meanings as those in FIG. 2.

Where the decomposable polymers having therein linkage units derived from precursors of coumarins, anthracenes or the like are desired to be decomposed into the constitutive oligomers, these shall be subjected to photo-reaction which is opposite to the above-mentioned photo-dimerization by changing the wavelength of the light to be irradiated thereto.

Order of Steps in the Second and Third Aspects:

The order of the above-mentioned steps (1) to (3) in the second aspect and that of the above-mentioned steps (1) to (4) in the third aspect are not specifically defined, provided that these aspects can attain the objects of the present invention. If possible, plural steps of these can be conducted in parallel and at the same time.

As some practical examples of conducting these steps, employable are a process comprising 'formation of oligomer units'→'formation of linkage units'→'determination of the shape of the polymer to be molded by the use of a shaping means'→'formation of cross-linked units' in that order; and a process comprising 'formation of oligomer units'→'formation of cross-linked units'→'preparation of linkage units'→'determination of the shape of the polymer to be molded by the use of a shape forming means'→'completion of the linkage units' in that order. In these processes, the steps after the determination of the shape of the polymer to be molded by the use of a shape forming means can be conducted, for example, by controlling temperature (by heating, etc.) or by applying some other external stimulation, such as micro-waves, etc., to the polymer.

In practice, the step of forming linkage units (or the step of preparing linkage units followed by the step of completing the linkage units) and the step of forming cross-linked units may be conducted in any desired order substantially possible of realization. The material (polymer) after these two steps usually solidifies. Therefore, the shape of the material to be molded according to the method of the present invention must be determined by any suitable shaping means at any suitable step prior to the completion of such cross-linkage units in the material.

Step of Forming Oligomer Units:

The step of forming oligomer units in the recyclable cross-linked polymer of the invention is to form oligomer units with a predetermined degree of polymerization that constitutes the polymer by polymerization of monomers. In many cases, it is desirable that each oligomer unit to be formed at this step has functional group(s) at its one end or both ends, via which the oligomer unit can be linked with the linkage unit in the subsequent step.

As one advantageous embodiment of the step of forming such oligomer units, living polymerization is mentioned. As well known, living polymerization is to employ particular polymerization initiators and particular polymerization conditions to thereby produce particular polymers, which is characterized by the following aspects that could not be attained by any simple polymerization.

1 It is possible to obtain polymers having a narrow molecular weight distribution, namely those having a uniform degree of polymerization.

2 It is possible to desirably control the molecular weight of the polymers to be produced, broadly ranging from oligomers having a low molecular weight of several hundreds or lower to high polymers having a high molecular weight of several hundred thousands or higher.

3 It is easy to introduce functional group(s) into the polymers to be produced, at one end or both ends via which the polymers can be linked with linkage units.

As also well known, the living polymerization includes cationic polymerization, anionic polymerization, radical polymerization and coordination polymerization (Zieglar-Natta polymerization or metathesis polymerization). Any of these can be employed in the present invention.

As another embodiment of the step of forming oligomer units, a method of using radical polymerization initiators is mentioned. According to this method, monomers are subjected to radical polymerization in the presence of a radical polymerization initiator having functional group(s) via which the resulting polymer can be linked with linkage units, and the grown radicals are reacted with each other to form oligomer units having the functional groups at the both ends.

Figure 4:
FIG. 4 shows one example of the step of forming an oligomer unit in the present invention.

As still another embodiment of the step of forming oligomer units, telomerization using chain transfer agents is mentioned. According to this, for example, n's monomers (nM) are polymerized along with a telogen X-Y to obtain a telechelic oligomer (X-Mn-Y), as in FIG. 4.

Figure 5:
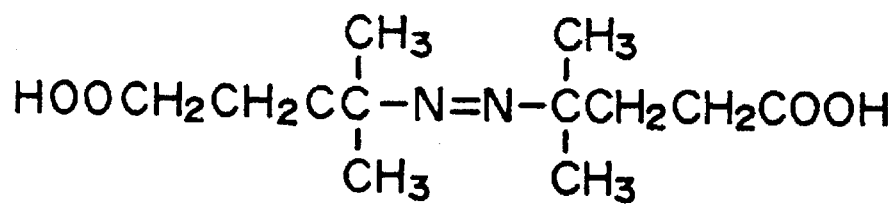
FIG. 5 shows one example of radical polymerization initiators employable in the step of forming oligomer units in the present invention.
Figure 6:
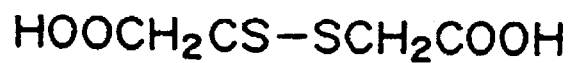
FIG. 6 shows one example of chain transfer agents employable in the step of forming oligomer units in the present invention.

By combining the above-mentioned method of using radical polymerization initiators and the above-mentioned telomerization of using chain transfer agents, it is possible to obtain the intended oligomers at higher yield. For example, when monomers such as styrene and the like are polymerized by radical polymerization while using 4,4-azobis-4-cyanovaleric acid shown in FIG. 5 as the radical polymerization initiator and using dithioglycolic acid as the chain transfer agent, oligostyrenes having carboxyl groups at the both ends can be obtained.

Figure 7:
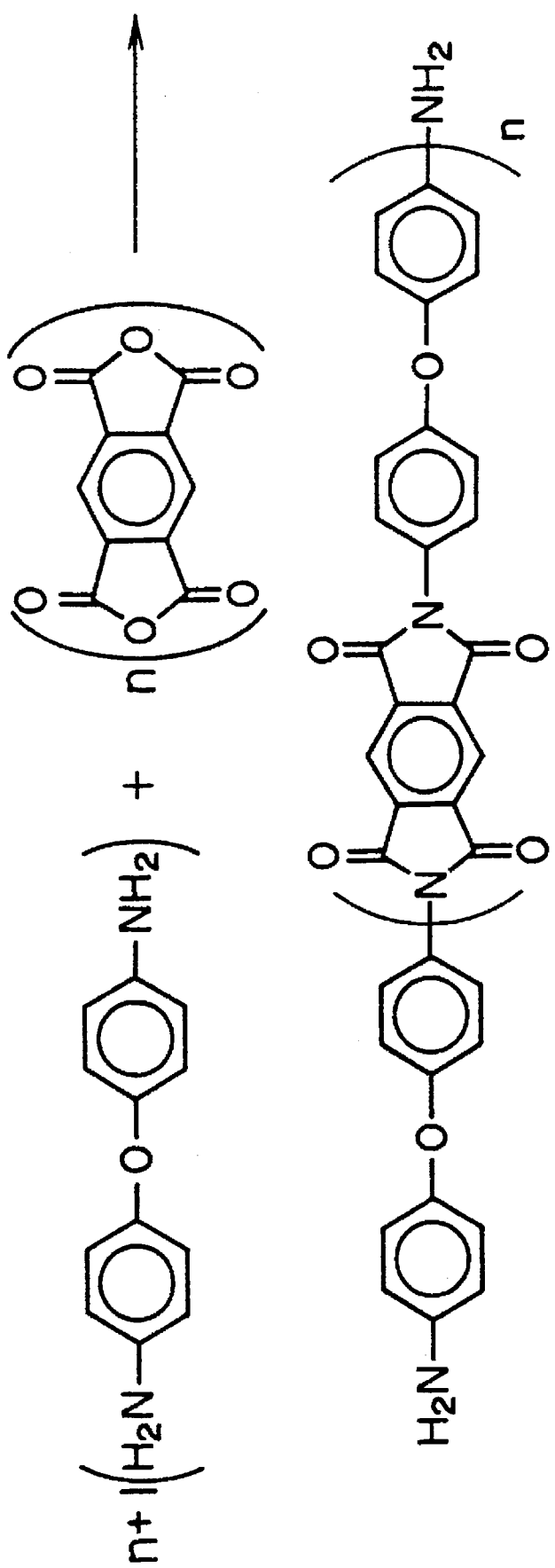
FIG. 7 shows another example of the step of forming an oligomer unit in the present invention.

As still another embodiment of the step of forming oligomer units, a method of utilizing polycondensation or polyaddition is mentioned. According to this method, one of the two monomers to be polymerized is made excessive over the other, whereby the oligomer units thus produced can have particular functional group(s) at the end(s) via which the oligomer units can be linked with linkage units. For example, when a diamine monomer is polymerized with an acid anhydride monomer by polycondensation to obtain a polyimide-type oligomer unit as shown in FIG. 7, the diamine monomer component is made excessive over the other, whereby the resulting oligomer unit can have an amino group at the both ends.

Steps of Forming, Preparing and Completing Linkage Units:

The step of forming linkage units is to link the ends of the oligomer units formed as above to linkage units. In this step, the oligomer units need not be always completed. After the monomers that constitute the ends of the oligomer units have been linked to linkage units in this step, the polymerization of the monomers into the intended oligomer units may then be initiated. As in the second aspect, the linkage units may have been already completed prior to this step. Alternatively, as in the third aspect, it is also possible that precursors of the linkage units are first linked to the oligomer units in the prior step of preparing linkage units and thereafter the precursors are converted into the intended linkage units in the posterior step of completing the linkage units.

As one embodiment of the step of forming such linkage units, for example, a method of reacting oligomer units that have been formed by living anionic polymerization with dichlorotetramethyldisilane, Cl—Si(CH$_3$)$_2$—Si(CH$_3$)$_2$—Cl that constitutes a linkage unit is mentioned. By this method, a decomposable polymer is obtained, as shown in FIG. 8. In FIG. 8, the waved lines indicate styrene oligomer units having a predetermined degree of polymerization.

The main chain of the formed decomposable polymer can be decomposed or decomposed into the individual oligomer units after the cleavage of the linkage units at the Si—Si bond, and the cleaved linkage units can be re-formed by re-bonding of the Si—Si bond, via which the individual oligomer units can be linked to each other to re-form the main chain of the original polymer. Thus, the cleavage of the Si—Si bond and the re-bonding thereof are repeated.

Figure 9:
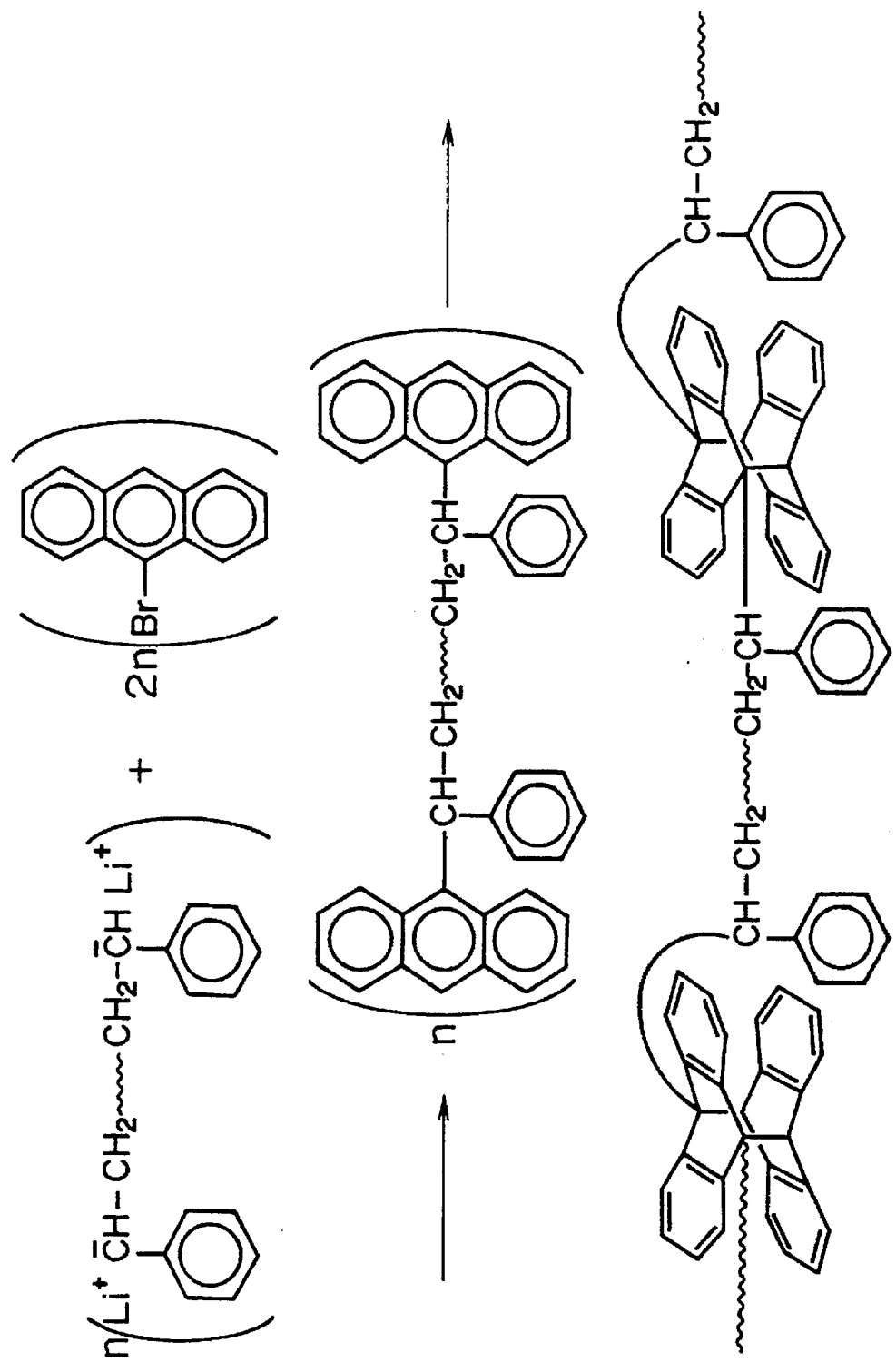
FIG. 9 shows one example of the method of the present invention comprising a step of preparing linkage units followed by a step of completing the linkage units.

As one embodiment of the step of preparing linkage units followed by the step of completing the linkage units, for example, mentioned is a process of bonding a precursor of a linkage unit, bromoanthracene, to the both ends of the oligomer unit as having been produced by living anionic polymerization to thereby terminate the polymerization, followed by dimerizing the bromoanthracene by photo-dimerization to thereby complete the intended linkage unit, as in FIG. 9. In FIG. 9, the waved lines indicate oligomer units having a predetermined degree of polymerization.

As still another embodiment of the step of preparing linkage units followed by the step of completing the linkage units, for example, mentioned is a process of producing different two oligomers by oligomerization using a living cationic polymerization initiator and a living anionic polymerization initiator having functional groups A and B, respectively, which can be linked to each other, and thereafter combining these oligomers by bonding the carbon cation at the polymerization end of one oligomer to the carbon anion at the polymerization end of the other oligomer to form an oligomer unit. After this process, a plurality of the formed oligomer units are linked to each other via the linkage between the terminal functional groups A and B to construct the main chain of a decomposable polymer.

Figure 10:
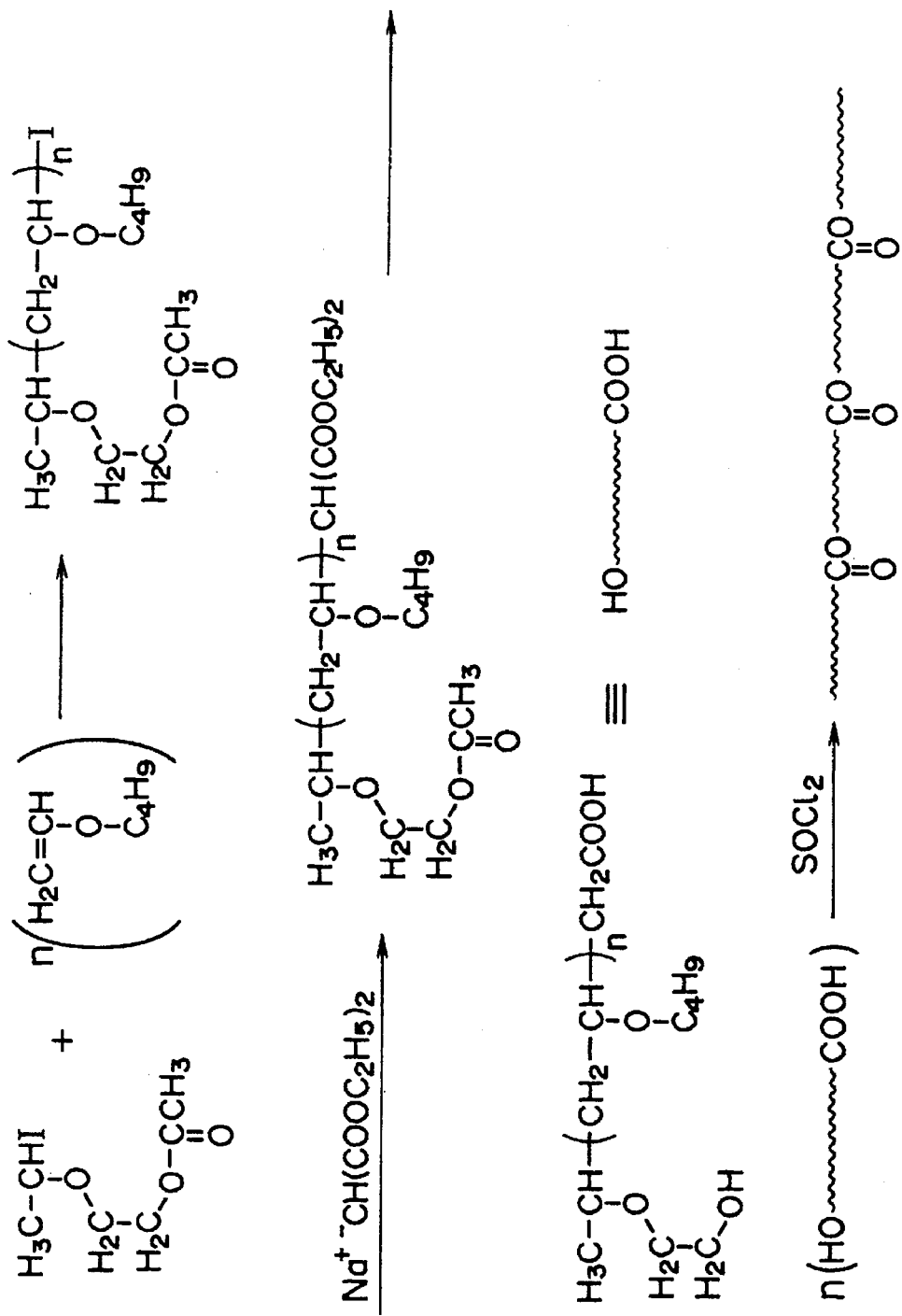
FIG. 10 shows another example of the method of the present invention comprising a step of preparing linkage units followed by a step of completing the linkage units.

As still another embodiment of the step of preparing linkage units followed by the step of completing the linkage units, for example, a method of bonding different linkage unit precursors to the both ends of oligomer units is mentioned. For example, as shown in FIG. 10, an oligomer is produced by living cationic polymerization using an acetoxyvinyl ether-HI adduct as the polymerization initiator, then the polymerization is terminated by sodium ethyl malonate, Na—CH(COOC$_2$H$_5$)$_2$, and thereafter the oligomer is hydrolyzed to have a hydroxyl group at one end and a carboxyl group at the other end. Next, at the process of completing the linkage units, a plurality of these oligomers are linked to each other via an ester bond therebetween to complete the main chain of a decomposable polymer. By hydrolysis of the ester bonds in the main chain, the polymer can be decomposed into the individual oligomer units.

As still another embodiment of the step of preparing linkage units followed by the step of completing the linkage units, for example, mentioned is a process of preparing two oligomers, one being an oligomer having the same functional groups A at the both ends and the other being an oligomer having the same functional groups B at the both ends (in these, the functional groups A and B can be bonded to each other and the bonded linkage can be cleaved into the individual groups A and B), followed by linking a plurality of these oligomers to each other through the reaction of the functional groups A and B to produce the main chain of a decomposable polymer. For example, at the step of preparing linkage units, oligomers each having hydroxyl groups at the both ends and oligomers each having carboxyl groups at the both ends are prepared, and at the next step of completing the linkage units, a plurality of these oligomers are linked to each other via the ester bond therebetween to form the main chain of a decomposable polymer. The main chain of the formed decomposable polymer can be decomposed by hydrolysis of the ester bonds therein into the individual oligomer units.

Main Chains to be Produced in the Previous Steps:

The oligomer units to be formed in any of the above-mentioned steps of forming oligomer units, forming linkage units, preparing linkage units and completing linkage units may be either linear or branched.

Step of Forming Cross-linked Units:

The above-mentioned embodiments of "cross-linked oligomer units" and "cross-linked units" are applied to the step of forming cross-linked units.

decomposition into Constitutive Oligomers in the Fourth Aspect:

The decomposing step in the fourth aspect of the invention is to subject a recyclable cross-linked polymer to treatment for cleaving the chemical bonds in the linkage units therein, thereby degrading the polymer into aggregates of meltable cross-linked oligomer units. At this step, a part of the cross-links in the cross-linked units in the polymer may often be influenced by the treatment to be cleaved.

The treatment for cleaving the chemical bonds in the linkage units may differ, depending on the type of the chemical bonds in the linkage units, as so mentioned hereinabove. In general, any suitable one can be selected from pyrolysis, photolysis with any of ultraviolet light to visible light, hydrolysis, solvolysis with any of methanol, ethyleneglycol, etc., and also reversible reactions utilizing redox systems or radiation of rays with varying wavelengths, etc.

Step of Collecting Oligomer Units in the Fourth Aspect:

The step of collecting oligomer units in the fourth aspect is to differentiate the cross-linked oligomer units from other materials by utilizing the difference in the meltability (fluidity) or in the solubility in a solvent between the cross-linked oligomer units obtained in the previous degrading step and other materials.

For example, when wastes containing various polymer materials are subjected to the decomposition treatment, only the recyclable cross-linked polymer to be therein is decomposed into the constitutive low-molecular, cross-linked oligomers. First, as a result, the fluidity of the decomposed, cross-linked oligomers becomes significantly higher than that of the other polymer materials in the wastes, and therefore only the cross-linked oligomers can be differentiated from the other polymer materials by filtration through a mesh plate or by decantation or the like. Secondly, the solubility of the cross-linked oligomers in various solvents becomes significantly higher than that of the other polymer materials therein, and therefore only the cross-linked oligomers can be differentiated from the other polymer materials by extraction with a particular solvent.

Regeneration Steps in the Fourth Aspect:

The necessary treatments in the above-mentioned steps of forming linkage units, preparing linkage units, completing linkage units and forming cross-linked units may apply to the regeneration steps and the step of restoring the original cross-links in the fourth aspect.

EMBODIMENTS OF THE INVENTION

Next, embodiments of the present invention are mentioned below, which, however, are not intended to restrict the scope of the present invention.

Embodiment 1:

A THF (tetrahydrofuran) solution of sodium (460 mg, 20 mmols) and a THF solution of naphthalene (2.56 g, 20 mmols) were separately put into two flasks, and the two were mixed by stirring for 2 hours at room temperature to prepare a solution of sodium-naphthalene complex. A THF solution of isoprene (68 g, 1 mol) was added to the resulting solution and reacted for one hour to produce an anion-terminated polyisoprene oligomer having carbon anions at the both ends.

Figure 11:
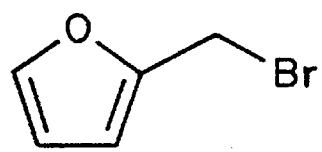
FIG. 11 shows a compound used in Embodiment 1.
Figure 12:
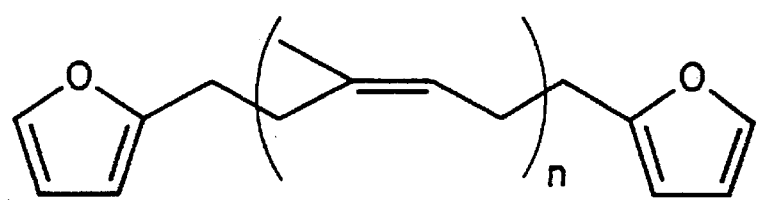
FIG. 12 shows Oligomer A prepared in Embodiment 1.

The anion-terminated polyisoprene oligomer solution prepared above was halved. 25 mmols of the compound of FIG. 11 was added to one solution and stirred for one hour to obtain a polyisoprene oligomer (Oligomer A) of FIG. 12 having a molecular weight of about 3,600 and having furan rings as introduced into the both ends, the furan rings being precursors of linkage units.

Figure 13:
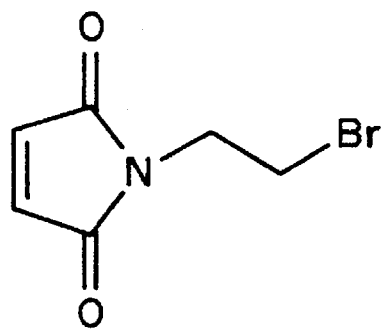
FIG. 13 shows a compound used in Embodiment 1.
Figure 14:
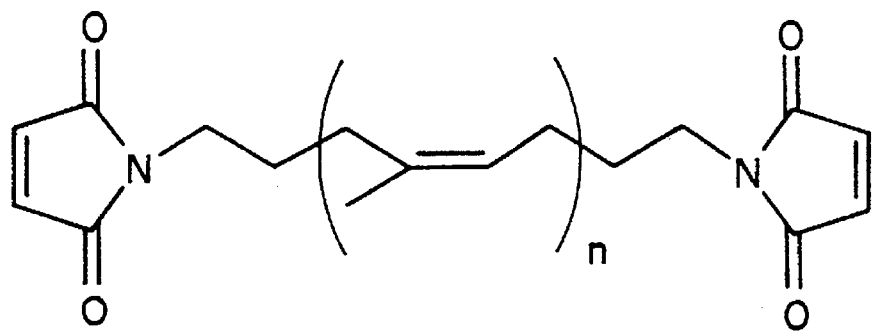
FIG. 14 shows Oligomer B prepared in Embodiment 1.

On the other hand, 25 mmols of the compounds of FIG. 13 was added to the other solution and stirred for one hour to obtain a polyisoprene oligomer (Oligomer B) of FIG. 14 having a molecular weight of about 3,500 and having maleimide rings as introduced into the both ends, the maleimide rings being precursors of linkage units.

The solution of Oligomer A and the solution of Oligomer B were mixed and reacted at 50° C. for 20 hours to obtain a linear polymer having a molecular weight of about 250,000 in which Oligomer A and Oligomer B were linked to each other via the linkage unit as formed by the Diels-Alder reaction between the furan ring and the maleimide ring.

Two parts by weight of sulfur, one part by weight of a vulcanization promoter, Nocceler NS—P (e.g. Ohuchi Shinko Chemical Co., N-tert-butyl-2-benzothiazolylsulfenamide), 3 parts by weight of zinc oxide and 2 parts by weight of stearic acid were added to 100 parts by weight of the linear polymer prepared above and kneaded, whereby the polymer was vulcanized to be a recyclable cross-linked polymer (cross-linked polyisoprene type) of which a part of the structure is shown in FIG. 1. In FIG. 1, the waved parts indicate the polyisoprene oligomer units, the white rectangular parts indicate the linkage units, and —S— and —S—S— indicate the cross-linked units formed by the vulcanization.

The kneaded blend was press-shaped into a 30 cm=30 cm sheet having a thickness of 5 mm. The sheet was cut into dumbbell test pieces, which were subjected to a tensile strength test according to JIS-K 6301. The test results are shown in Table 1 below in the column of "original product".

TABLE 1

| Physical Properties | Example 1 (original product) | Example 1 (recycled product) | Comparative Example 1 (commercial product) |
| --- | --- | --- | --- |
| Tensile Strength (kg/cm$^2$) | 250 | 240 | 250 |
| Elongation (%) | 650 | 615 | 600 |

As Comparative Example 1 to be compared with Embodiment 1, a commercial product of vulcanized polyisoprene (having a number-average molecular weight of about 250,000) not having any linkage unit therein was subjected to the same tensile strength test. The data of this comparative sample are also shown in Table 1 above. As is obvious from the data in Table 1, the tensile strength and the elongation of the recyclable cross-linked polymer obtained in Embodiment 1 are almost comparable to those of the commercial product of vulcanized polyisoprene.

Next, the recyclable cross-linked polymer obtained herein was decomposed by heating it at 130° C. for one hour for reverse Diels-Alder reaction, whereupon the viscosity of the decomposed product was noticeably lowered. The reason is considered because the linkage units in the polymer were decomposed to give an aggregate comprising cross-linked Oligomer A units and cross-linked Oligomer B units. In view of the decrease in the viscosity of the decomposed product, it is considered easy to fractionate the recyclable cross-linked polymer from waste mixtures such as those comprising the polymer along with wastes of other materials.

To regenerate the polymer from the product that had been obtained by the decomposition according to the above-mentioned reverse Diels-Alder reaction, the decomposed product was cast into a mold having a cavity with a predetermined shape and heated at 40° C. for one hour, whereupon the product was again subjected to Diels-alder reaction. Accordingly, the linkage units were re-formed in the molded article. The article was subjected to the same tensile strength test as above, and the test results obtained are shown in Table 1 above in the column of "recycled product". As is known from Table 1, the physical properties of the recycled product are almost the same as those of the original product.

As Comparative Example 2, the same vulcanized polyisoprene as that used in Comparative Example 1 was treated under the same decomposition condition (heating at 130° C. for one hour) as in Embodiment 1. However, neither the viscosity of the treated comparative polymer was lowered nor the polymer was melted, resulting in failure in re-molding the polymer.

Figure 15:
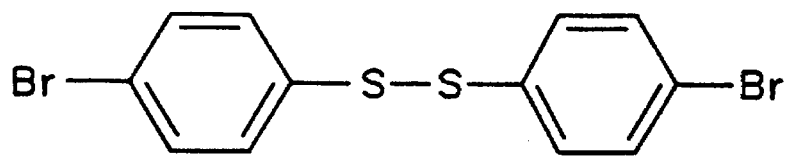
FIG. 15 shows a compound used in Embodiment 2.

Embodiment 2:

10 mmols of the compound of FIG. 15 was added to the same THF solution comprising the anion-terminated polyisoprene oligomer as in Embodiment 1 and stirred for one hour, whereby the bromines at the both ends of the compound of FIG. 15 were substituted with the oligomer units to obtain a linear polymer having a number-average molecular weight of about 250,000 and composed of numerous anion-terminated polyisoprene oligomer units as linked to each other via the linkage unit derived from the compound of FIG. 15 having a linkage of —S—S— bond.

The produced linear polymer was vulcanized under the same conditions as in Embodiment 1 to obtain a recyclable cross-linked polymer (cross-linked polyisoprene type). Next, a sheet was formed from the vulcanized mixture in the same manner as in Embodiment 1, and test pieces were cut out of the sheet also in the same manner as in Embodiment 1. These test pieces are the original products in Embodiment 2. These were subjected to the same test as in Embodiment 1. The test results are such that the tensile strength was 240 kg/cm$^2$ and the elongation was 640%. These are comparable to the data of the commercial product in Comparative Example 1.

Next, the vulcanized mixture was finely ground and heated under reflux (at about 100° C.) for one hour in dioxane along with tributylphosphine. By this treatment, the linkage units of —S—S— bond in the polymer were cut to give an aggregate of cross-linked oligomer units. In addition, it was presumed that the —S—S— bond of the vulcanized cross-links in the resulting oligomer units would also be cut by the treatment. The finely-ground powder was melted after this treatment and became soluble in organic solvents.

The melt obtained after the above-mentioned treatment was cast into a mold and heated at 150° C. for 10 minutes, whereby it was re-cured to obtain a molded article of the recycled product in Embodiment 2. This was tested under the same conditions as in Embodiment 1. The test revealed that the tensile strength of the article was 270 kg/cm$^2$ and the elongation thereof was 580%. From these data, it is known that, in Embodiment 2, the physical properties of the recycled product are almost the same as those of the original product. Accordingly, it is presumed that the linkage in the linkage units was re-formed by the regeneration treatment and, in addition, the —S—S— bond in the cross-linked units that had once been cut by the previous treatment was also re-formed by the regeneration treatment.

As Comparative Example 3 to be compared with Embodiment 2, a commercial product of vulcanized polyisoprene (having a number-average molecular weight of about 250, 000) not having any linkage unit therein was heated under reflux under the same conditions as in Embodiment 2. As a result, it was presumed that a part of the cross-linked units were cut, and the product was decomposed into low-molecular units. However, the decrease in the viscosity of the decomposed product was unsatisfactory and the re-molding of the decomposed product was impossible.

Next, as Comparative Example 4, the above-mentioned commercial product of vulcanized polyisoprene was finely ground, and diphenyldisulfide was added thereto. This was heated in an autoclave at 160° C. for 5 hours, whereby the viscosity of the resulting product was lowered to such a degree that the product could be re-molded. The reason is considered because the treatment conditions employed were so severe that not only the —S—S— bond but also other —S— bond and —S—S—S— bond in the cross-linked units in the polymer were cut by the treatment.

Sulfur was added to the decomposed product having such a lowered viscosity to re-vulcanize it, and this was tested under same conditions as in Embodiment 1. As a result, it is found that the re-vulcanized product in Comparative Example 4 has extremely poor physical properties such as 120 kg/cm$^2$ in tensile strength and 275% in elongation. The reason is considered because the isoprene main chain of the polymer was cut during the decomposition treatment since the conditions for the treatment was too severe and the broken main chain could not be restored to its original state by the subsequent re-vulcanization.

Figure 16:
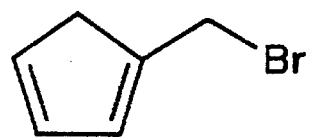
FIG. 16 shows a compound used in Embodiment 2.

Embodiment 3:

50 mmols of the compound of FIG. 16 was added to the same THF solution comprising the anion-terminated polyisoprene oligomer as in Embodiment 1 and stirred for one hour. Thus, a polyisoprene oligomer having cyclopentadienyl rings at the both ends was obtained. A plurality of these oligomers were reacted at 50° C. for 15 hours to obtain a linear polymer having a number-average molecular weight of about 270,000.

The produced linear polymer was vulcanized under the same conditions as in Embodiment 1 to obtain a recyclable cross-linked polymer (cross-linked polyisoprene type). Next, a sheet was formed from the vulcanized mixture in the same manner as in Embodiment 1, and test pieces were cut out of the sheet also in the same manner as in Embodiment 1. These test pieces are the original products in Embodiment 3. These were subjected to the same test as in Embodiment 1. The test results are such that the tensile strength was 250 kg/cm$^2$ and the elongation was 620%. These are comparable to the data of the commercial product in Comparative Example 1.

Next, the vulcanized mixture was finely ground and heated at 150° C. for one hour whereby the linkage in the linkage units in the polymer was cut and thus the polymer was decomposed into low-molecular units. The decomposed product was cast into a mold and heated therein at 50° C. for one hour whereby the linkage units were re-formed and the product was re-cured. Thus, a molded article of the recycled product in Embodiment 3 was obtained. This was tested under the same conditions as in Embodiment 1. The test revealed that the tensile strength of the article was 230 kg/cm$^2$ and the elongation thereof was 600%. From these data, it is known that, in Embodiment 3, the physical properties of the recycled product are almost the same as those of the original product.

Embodiment 4:

The same process as in Embodiment 1 was repeated, except that butadiene was used in place of the isoprene monomer. The physical properties of the original product obtained herein were such that the tensile strength was 200 kg/cm$^2$ and the elongation was 500%, while those of the recycled product were such that the tensile strength was 175 kg/cm$^2$ and the elongation was 400%.

As Comparative Example 5, a commercial product of vulcanized polybutadiene not having any linkage unit therein was tested in the manner as above, resulting in that its tensile strength was 175 kg/cm$^2$ and its elongation was 400%.

What is claimed is:

1. An elastomeric or rubbery, recyclable cross-linked polymer, which comprises:

oligomer units having polymerization degree or molecular weight that allows the units to liquefy;

cross-linked units for cross-linking individual units of said oligomer units; and linkage units linking a plurality of said oligomer units to form a main chain of the polymer, said linkage units comprising at least one chemical bond that can be cleaved and re-formed repeatedly by predetermined treatment that does not break a bond between monomers constituting the oligomer units, wherein said oligomer units comprise butadiene rubber, isoprene rubber, butyl rubber, ethylene-propylene rubber, styrene-butadien rubber, chloroprene rubber, nitrile rubber, acryl rubber, epichlorohydrin rubber, chlorosulfonated polyethylene, chlorinated polyethylene, silicone rubber or fluorine rubber.

2. The elastomeric or rubbery recyclable cross-linked polymer as claimed in claim 1, having a glass transition point of not higher than 0° C.

3. The elastomeric or rubbery recyclable cross-linked polymer as claimed in claim 1, having a density of cross-links of from 0.1 to 10% by weight based on the total weight of the polymer.

4. The elastomeric or rubbery recyclable cross-linked polymer as claimed in claim 1, wherein said cross-linked units comprise at least one sulfur cross-link selected from the group consisting of —S—, —S—S— and —S—S—S—.

5. The elastomeric or rubbery recyclable cross-linked polymer as claimed in claim 1, wherein said linkage units comprise —Si—Si— bonds, ester bonds (—C(=O)—O—), disulfide bonds (—S—S—), bonds formed from furan and maleimide rings, photodimerized coumarins, or photodimerized anthracenes.

* * * * *